United States Patent
Inada

[11] Patent Number: 5,778,941
[45] Date of Patent: Jul. 14, 1998

[54] CLEANER HOSE

[75] Inventor: Tomio Inada, Osaka, Japan

[73] Assignee: Totaku Industries, Inc., Osaka, Japan

[21] Appl. No.: 675,075

[22] Filed: Jul. 3, 1996

[30] Foreign Application Priority Data

Jul. 6, 1995 [JP] Japan ................... 7-195918

[51] Int. Cl.$^6$ ........................................ F16L 11/11
[52] U.S. Cl. ............... 138/134; 138/132; 138/133; 138/129; 138/127
[58] Field of Search ........................ 138/134, 133, 138/129, 122, 132, 127, 103, 131; 156/144

[56] References Cited

U.S. PATENT DOCUMENTS

| | | | |
|---|---|---|---|
| 2,927,625 | 3/1960 | Rothermel et al. | 138/134 X |
| 2,941,571 | 6/1960 | Rothermel | 138/134 X |
| 3,080,891 | 3/1963 | Duff | 156/144 X |
| 3,084,086 | 4/1963 | Roberts et al. | 156/144 X |
| 3,275,038 | 9/1966 | Roberts et al. | 138/134 X |
| 3,674,056 | 7/1972 | D'Aprile | 138/134 |
| 4,091,063 | 5/1978 | Logan | 138/134 X |
| 4,380,253 | 4/1983 | Mead et al. | |
| 4,721,637 | 1/1988 | Suzuki et al. | |
| 5,416,270 | 5/1995 | Kanao | |
| 5,555,915 | 9/1996 | Kanao | 138/133 |

FOREIGN PATENT DOCUMENTS

Hei 4-193048  7/1993  Japan .

*Primary Examiner*—Patrick F. Brinson
*Attorney, Agent, or Firm*—Whitham, Curtis, Whitham & McGinn

[57] ABSTRACT

A cleaner hose includes a synthetic resin pipe and four reinforcing hard steel wires disposed spirally, at predetermined intervals, in the synthetic resin pipe wall. The reinforcing hard steel wires are coated wires which are coated with synthetic resin. The pipe wall includes inner and outer layers in which an under wound tape and an upper wound tape are spirally wound while being displaced by half pitch from each other.

14 Claims, 6 Drawing Sheets

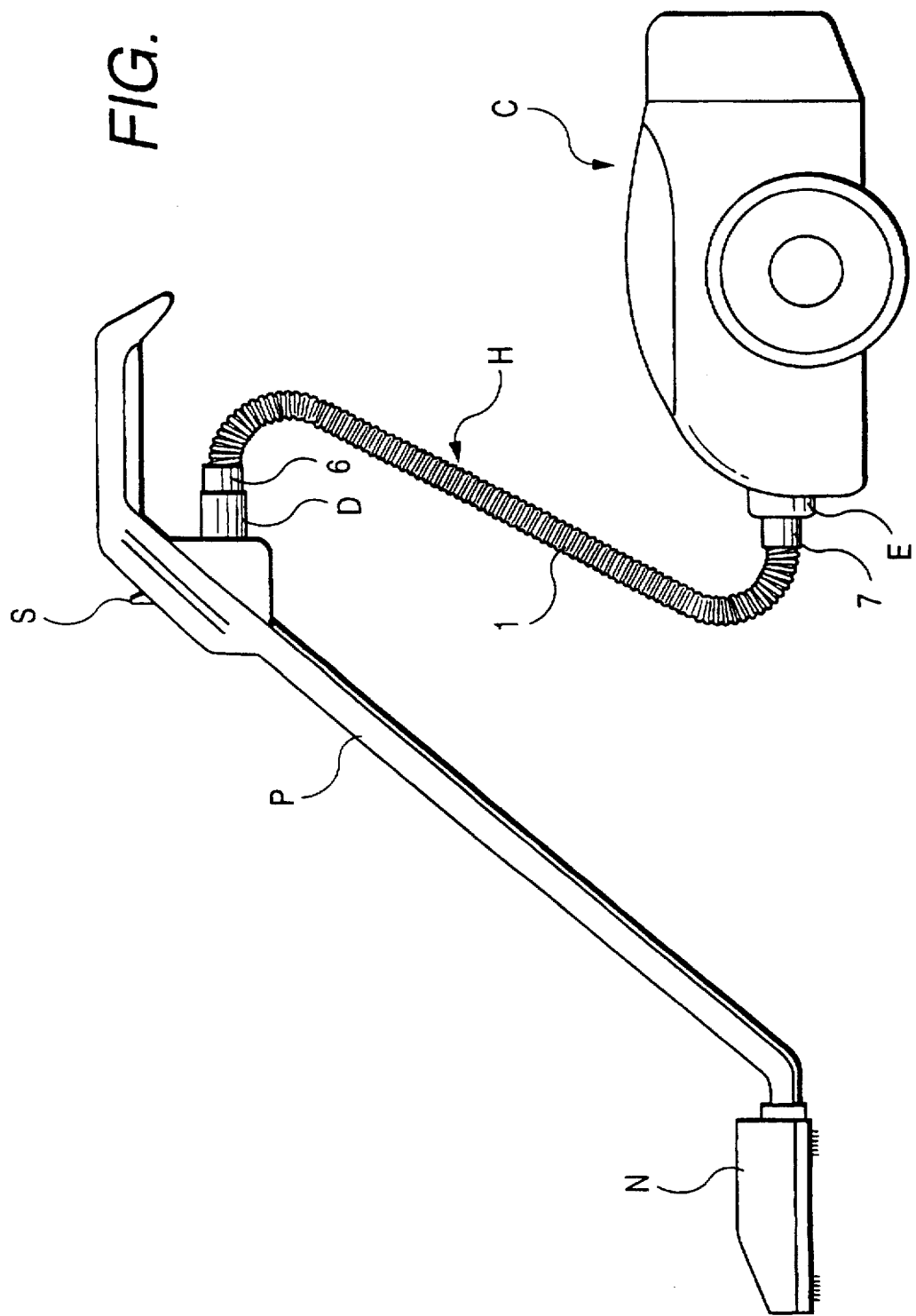

CLEANER HOSE

BACKGROUND OF THE INVENTION

The present invention relates to a cleaner hose for use with an electric cleaner connected thereto. Particularly, the present invention relates to a cleaner hose with reinforcing wires, in which reinforcing metal wires are spirally wound inside a pipe wall formed of a synthetic resin material.

As the structure of such a conventional cleaner hose for use with an electric cleaner, generally known is such a structure that a pipe wall is formed into a spirally corrugated shape and a reinforcing metal wire is enclosed in the inside of the protrusion of the corrugated shape of the pipe wall as it is in the bared state, or the reinforcing metal wire is disposed on the inner circumferential side of the protrusion of the corrugated shape of the pipe wall as it is in the resin-coated state.

With respect to recent electric cleaners, it has been coming a mainstream to have a function to clean effectively not only by turning a power supply of an electric cleaner body C ON-OFF to suck air, but also by attaching a motor and a rotary brush to a suction nozzle head N attached to the forward end of an operation pipe P so that the rotary brush is made to rotate suitably to an object to be cleaned such as a floor, a carpet or the like, or the height of the brush from the floor is changed and adjusted suitably, as shown in FIG. 5.

Therefore, in order to cope with an electric cleaner having such a function as mentioned above, it is required also for a cleaner hose to have not only a function of simply turning the power supply of the cleaner body C ON-OFF but also a function by which an ON-OFF operation for the rotary brush motor installed in the suction nozzle head N on the forward end of the operation pipe can be performed at a handling portion of the operation pipe P. In the structure of a hose H, therefore, as shown in FIG. 8, a coated wire 40 is wound spirally with double pitches inside a pipe wall 10. In the coated wire 40, a reinforcing wire 20 for reinforcing the hose to maintain its shape and also for acting as a current conducting wire for performing an ON-OFF operation for the power supply of the cleaner body C and a power conducing wire 30 disposed separately from and parallelly with the reinforcing wire 20 are coated integrally but insulated from each other.

However, in such a cleaner hose in which the power conducting wire 30 is provided in the hose separately from the reinforcing wire 20, not only there is a problem that the total weight of the hose becomes heavy, but also there is a danger that the power conducting wire 30 cannot stand a long term use and may be broken.

SUMMARY OF THE INVENTION

It is therefore an object of the present invention to solve the foregoing problems belonging to such a conventional hose H and to provide a hose for an electric cleaner having a rotary brush in a suction nozzle head, in which not only power can be conducted to the suction nozzle head, but also the property of maintaining the shape of the hose is superior, the total weight of the hose is lighter than the above-mentioned conventional hose having a power conducting wire separately, it can be used with less fatigue, and the fear of disconnection of the wires is extremely less even for a long term use.

A cleaner hose according to the present invention does not use a power conducting wire, but uses a reinforcing wire made of a hard steel wire also as a power line, and has a structure where only four reinforcing hard steel wires are used and wound spirally at predetermined intervals inside a pipe wall.

In carrying out this hose, there are two cases. That is, each of the reinforcing hard steel wires is used as a bared wire in one case, while it is used as a coated wire coated with synthetic resin in the other case. In addition, the pipe wall may be formed of a synthetic resin tube, or may be formed by winding a synthetic resin tape spirally. This pipe wall is not limited to that which has a single layer, but it may be formed to have a structure having inner and outer layers. In the case of such a structure having inner and outer layers, reinforcing threads may be disposed between the layers. In addition, when the layers are formed by winding tapes, an under wound tape and an upper wound tape may be wound spirally while their pitches are displaced from each other by half pitch. In addition, in the case of such a structure having the inner and outer layers, the inner and outer layers may be bonded only at outer circumferential portions of the reinforcing wires, and the portions where the reinforcing wires do not exist do not need to be bonded. Further, when the pipe wall has the inner and outer layers, the reinforcing wires or the reinforcing resin-coated wires (coated wires) may be disposed between the layers.

Since the cleaner hose according to the present invention has such a structure as mentioned above, when it is to be used as an electric cleaner hose, connection pipes are connected to the opposite ends of the hose. Then, the connection pipe on one end is plugged into a suction pipe of a cleaner body and at the same time an electric connector is plugged in, while the connection pipe on the other end is plugged into a plug-in pipe of an operation pipe and at the same time an electric connector is plugged in.

In this way, the cleaner hose according to the present invention is connected between the electric cleaner body and the operation pipe through the connection pipes on opposite sides, so that a continuous air path is formed between the electric cleaner body and the suction nozzle head, an ON-OFF power supply circuit of the cleaner body comprises the two of the reinforcing hard steel wires, and at the same time a current conducting path between a power supply of the cleaner body and a motor installed in the suction nozzle head comprises the other two of the reinforcing hard steel wires. Then, an operation switch of the operation pipe is operated to perform an ON-OFF operation for the nozzle-side motor so as to suck dust from a nozzle of the suction nozzle head while a brush is rotated to thereby perform cleaning operation.

BRIEF DESCRIPTION OF THE DRAWINGS

FIG. 5 is a side view illustrating the state where the hose is connected to an electric cleaner;

DETAILED DESCRIPTION OF THE INVENTION

Preferred embodiments of the present invention will be described below with reference to the drawings.

Figure 1:
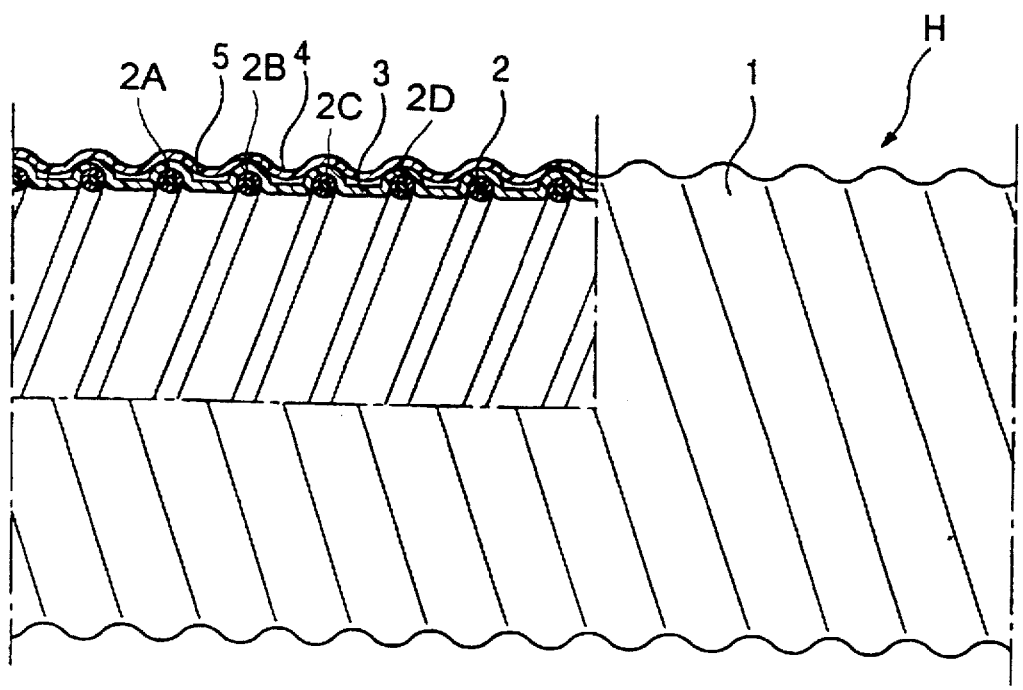
FIG. 1 is a partially cut-out front view illustrating a first embodiment.
Figure 2:
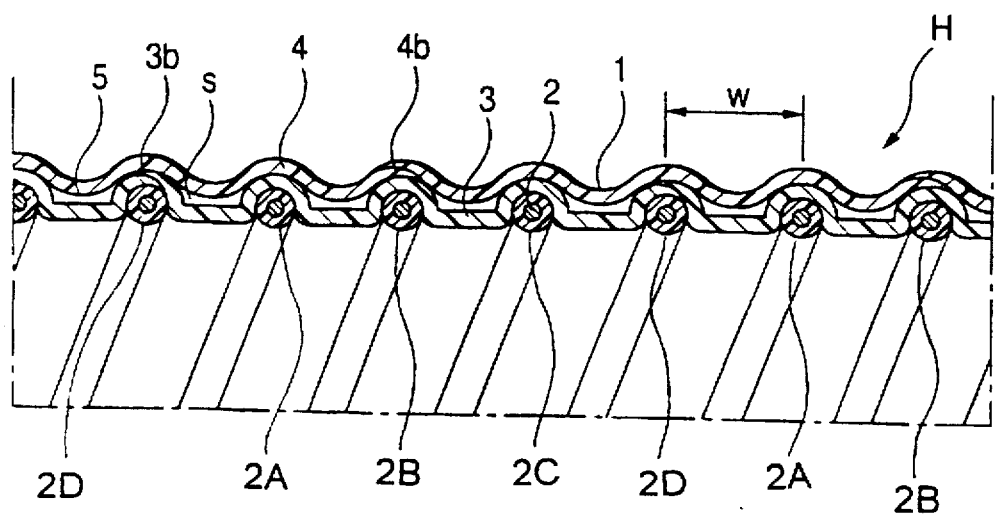
FIG. 2 is an expanded sectional view of a pipe wall portion in the embodiment.
Figure 3:
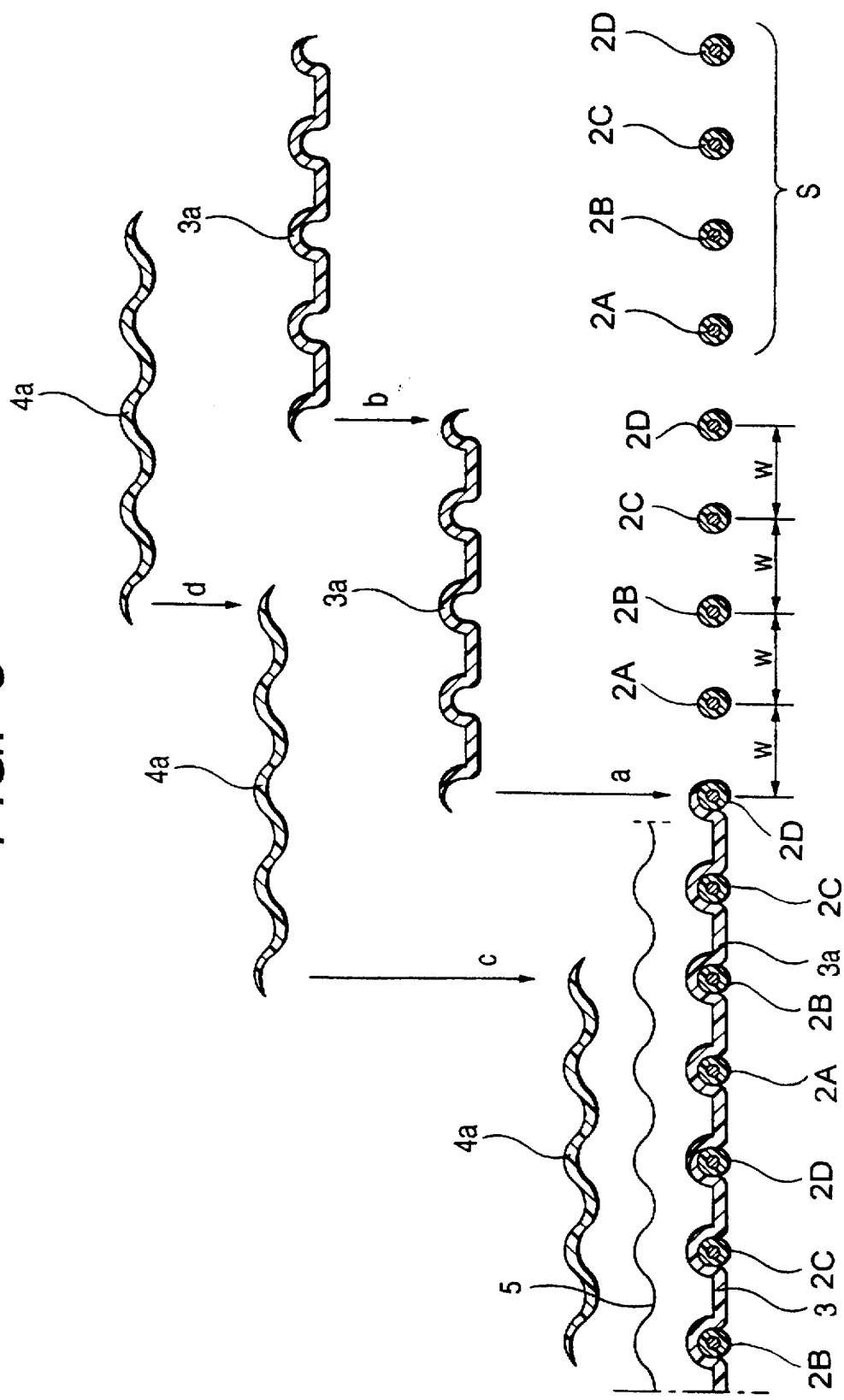
FIG. 3 is an exploded explanatory sectional view of the pipe wall.
Figure 4:
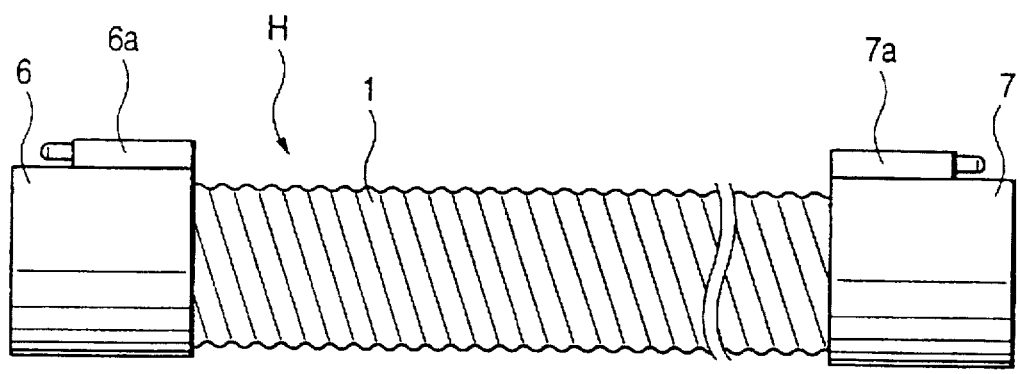
FIG. 4 is an intermediate omitted front view illustrating the state where connection pipes are coupled.

Of the drawings, FIGS. 1 to 4 are diagrams illustrating a first embodiment of the present invention. FIG. 1 shows the partially broken appearance of a hose H, FIG. 2 shows, in enlargement, the sectional shape of a pipe wall portion, FIG. 3 shows, in an exploded state, materials constituting the hose H, and FIG. 4 shows the state where connection pipes are connected to the opposite ends. In the hose H, a pipe wall 1 having a spirally corrugated shape is formed by use of a material, for example, such as soft polyvinyl chloride (PVC), polyethylene (PE), polypropylene (PP), or any other synthetic resin material, or a material in which rubber is mixed with any one of above-mentioned materials. The pipe wall 1 has inner and outer layers including an inner layer 3 and an outer layer 4, and twenty to thirty reinforcing threads 5 of nylon fibers, cotton fibers or other materials are disposed between these inner and outer layers 3 and 4, arranged side by side in the circumferential direction of the hose, and extended along the axial direction of the hose.

In the inner side of the protrusion of the corrugation in this pipe wall 1, four coated wires 2A-2D are disposed at predetermined intervals w and wound spirally while keeping the interval w between adjacent ones of the windings. In those coated wires 2A-2D, steel wires, piano wires, or other hard (e.g. hardened) wires obtained by giving corrosion-preventive plating to the above-mentioned wires (those wires will be hereinafter referred to as "hard steel wires or hardened steel wires") are used as cores 2, and the outer circumferential surfaces of those core hard steel wires 2 are coated with synthetic resin such as semihard PVC or the like, or material obtained by, for example, mixing conductive calcium carbonate with synthetic resin. These coated wires 2A-2D and the pipe wall 1 are bonded with each other by using a bonding agent. The inner and outer layers 3 and 4 of the pipe wall 1 are bonded in such a manner that the inner and outer layers are bonded with a bonding agent only at outer circumferential portions (protrusions) over each of the coated wires 2A-2D while other portions (recess portions) between adjacent ones of the coated wires 2A-2D are not bonded to thereby provide a non-bonded state with slight spaces S so that the inner and outer layers 3 and 4 can be freely flexibly transformed.

As shown in an exploded state in FIG. 3, in the hose H shown in this embodiment, a set G of the four coated wires 2A-2D where the reinforcing wires 2 are coated with resin are disposed side by side at predetermined intervals w and spirally wound while keeping the predetermined interval w between adjacent ones of the windings. A first tape 3a having a width wider than the distance over five coated wires in the axial direction of the pipe wall is wound spirally while with a bonding agent is applied onto the upper surfaces of the coated wires so that the first tape 3a is bonded to the coated wires in a manner such that the opposite side edges of the tape 3a are positioned on the upper surface of every fifth wire, and, at the same time, one side edge of the tape 3a is laid on an adjacent side edge of a precedingly wound portion of the tape 3a so as to be bonded thereto by a bonding agent as indicated by arrows a and b. Thus, the inner layer 3 is formed by applying the tape 3a sequentially.

For example, twenty six reinforcing threads 5 of nylon are disposed in the axial direction of the hose or disposed so as to cross each other. Then, a second tape 4a having a width wider than the distance over five coated wires 2A-2D similarly to the first tape 3a is wound spirally while applying a bonding agent to the outer circumferential surface of the first tape 3 with the reinforcing threads 5 only at portions corresponding to the outer circumferential portions of the coated wires 2A-2D, so that the second tape 4a is bonded with the first tape 3a, and, at the same time, the side edges of the second tape 4a adjacent to each other are laid on and bonded with each other as indicated by the arrows c and d to thereby form the outer layer 4. In this case, the second tape 4a is wound while being shifted widthwise by half pitch relative to the first tape 3a, that is, by a distance over two coated wires. Further, in FIG. 2, the reference numerals 3b and 4b designate the overlapped connected portions of the first and second tapes 3a and 4a, respectively. Although the first and second tapes 3a and 4a and the reinforcing threads 5 are illustrated so as to have corrugated shapes in FIG. 3 in order to facilitate understanding, it can be understood easily that flat belt-like tapes and straight threads are used ordinarily.

Connection pipes 6 and 7 formed separately are attached to the opposite ends of the thus formed hose H as shown in FIG. 4. At the same time, two pairs of reinforcing wires 2 . . . are connected to their connectors 6a and 7a to thereby form two electric circuits between these connectors 6a and 7a.

In the cleaner hose with the connection pipes 6 and 7 at its opposite ends, the connection pipe 7 on its one end is plugged into a suction pipe E of an electric cleaner body C while the connection pipe 6 on its other side is plugged into a suction pipe D on the top end of an operation pipe P so that an air suction path, an electric circuit for operating the cleaner body C, and another electric circuit for driving a motor provided in a suction nozzle head N provided on the forward end of the operation pipe P are formed between the cleaner body C and the operation pipe P.

Figure 6:
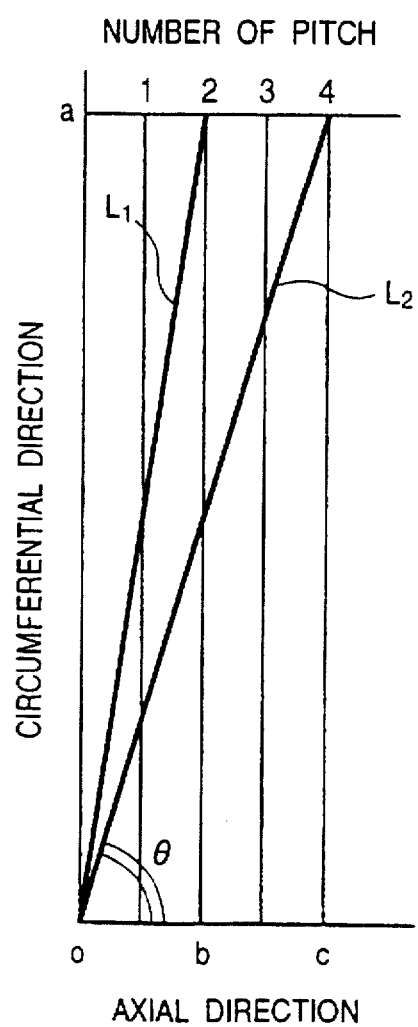
FIG. 6 is a comparison diagram of length of reinforcing wires.
Figure 8:
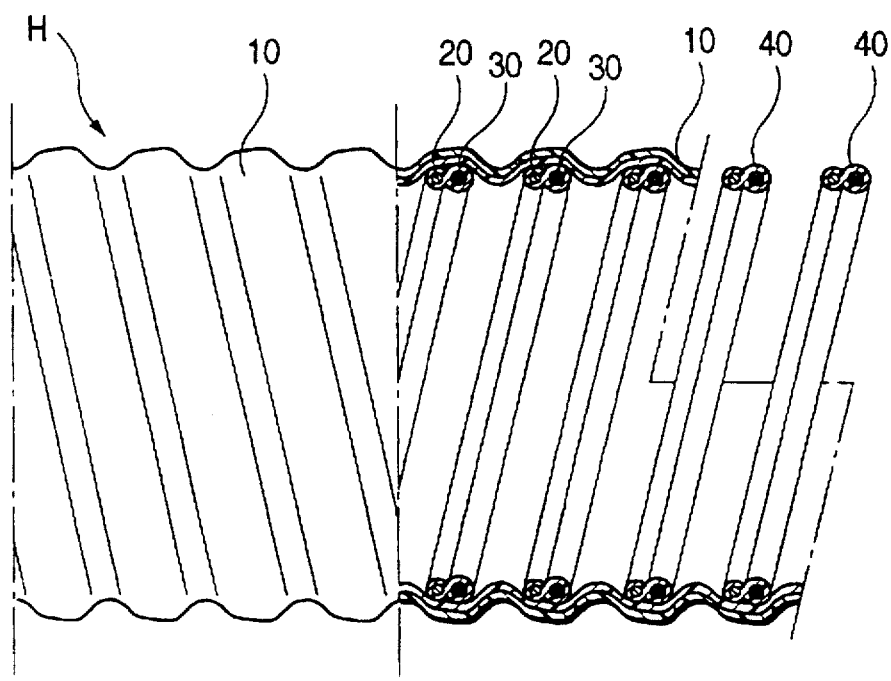
FIG. 8 is a partially cut-out front view of a pipe wall portion showing a conventional structure.

FIG. 6 is an explanatory development view for comparing the length of one spiral lap between the reinforcing wire 2 according to the present invention and the reinforcing wire 20 in the conventional hose shown in FIG. 8. It is assumed that the reinforcing wires used in the both hoses are the same. That is, it is assumed that the diameter of hard steel wire is 0.9 mm$\phi$, the diameter of the hoses, that is, the winding diameter of the reinforcing wires is 45 mm$\phi$, the pitch of the reinforcing wires is 10 mm, and the length of the hoses is 1 m. The length of each reinforcing wire used in the both hoses of 1 m length, the total length and the total weight of all the reinforcing wires, and the difference of the total weight may be calculated as follows.

<<Length of one reinforcing wire and total weight of wires in the conventional hose>>

The length of one reinforcing wire 20 and the total weight of wires in the conventional hose are obtained as follows. Since the length $L_1$ of one spiral lap is a diagonal of a quadrangle with ao=45π, and ob=20, the number of turns of the wire in the hose of 1 m is $^{100}/_{20}$=50, and the number of used wires is two.

$$L_1 = \sqrt{(20^2 + (45\pi)^2)}$$
$$= 142.71 \text{ (mm)}$$

142.71×50=7135.5 (mm) (the length of one reinforcing wire)

7135.5×2=14271 (mm) (the total length of the reinforcing wires) Because the diameter and the specific gravity of the hard steel wire are 0.9 mmφ and 7.86, respectively, $$\pi \times 0.45^2 \times 1 = 0.64 \text{ (mm}^2\text{)}$$

0.64×14271×(1/1000)×7.86=71.79 (g) (the total weight of the reinforcing wires)

<<Length of one reinforcing wire and total weight of wires in the hose according to the present invention>>

The length of one reinforcing wire 2 and the total weight of wires in the hose according to the present invention are obtained as follows. Since the length $L_2$ of one spiral lap is a diagonal of a quadrangle with ao=45π and oc=40, the number of turns of the wire in the hose of 1 m is 1000/40=25, and the number of used wires is four.

$$L_2 = \sqrt{(40^2 + (45\pi)^2)}$$
$$= 146.85 \text{ (mm)}$$

146.85×25=3671.25 (mm) (the length of one reinforcing wire)

3671.25×4=14685 (mm) (the total length of the reinforcing wires)

Because the diameter and the specific gravity of the hard steel wire are 0.9 mmφ and specific gravity 7.86, respectively, $$\pi \times 0.45^2 \times 1 = 0.64 \text{ (mm}^2\text{)}$$

0.64×14685×(1/1000)×7.86=73.87 (g) (the total weight of the reinforcing wires)

<<Electric resistant value>>

In the case where the length of the hoses is 1 m, the length of one reinforcing wire is 7135.5 mm in the conventional hose while the length of one reinforcing wire 3671.25 mm in the hose according to the present invention. Therefore, the rate of the former to the latter is:

7135.5:3671.25=100:51.45

The length of the reinforcing wire 2 in the hose according to the present invention is 51%, that is, almost an half, of the length of the reinforcing wire 20 in the conventional hose. Therefore, the electric resistance value of the wire is close to an half. Assuming that this reinforcing wire is a standard 0.9 mmφ wire of JIS Standards SWRH72A, the electric resistance value is about 300 Ω/km for the 0.9 mmφ wire because the electric resistance value is 250 Ω/km in the case of the 1.0 mmφ standard wire. Thus, it can be confirmed that the wire can conduct power to a small motor provided on the forward end of a nozzle portion in an electric cleaner.

<<Weight>>

When the total weight of the four reinforcing wires in the present invention is compared with the total weight of the two reinforcing wires in the conventional hose, the difference therebetween is obtained as follows:

73.87g−71.79g=2.08g

Figure 7:
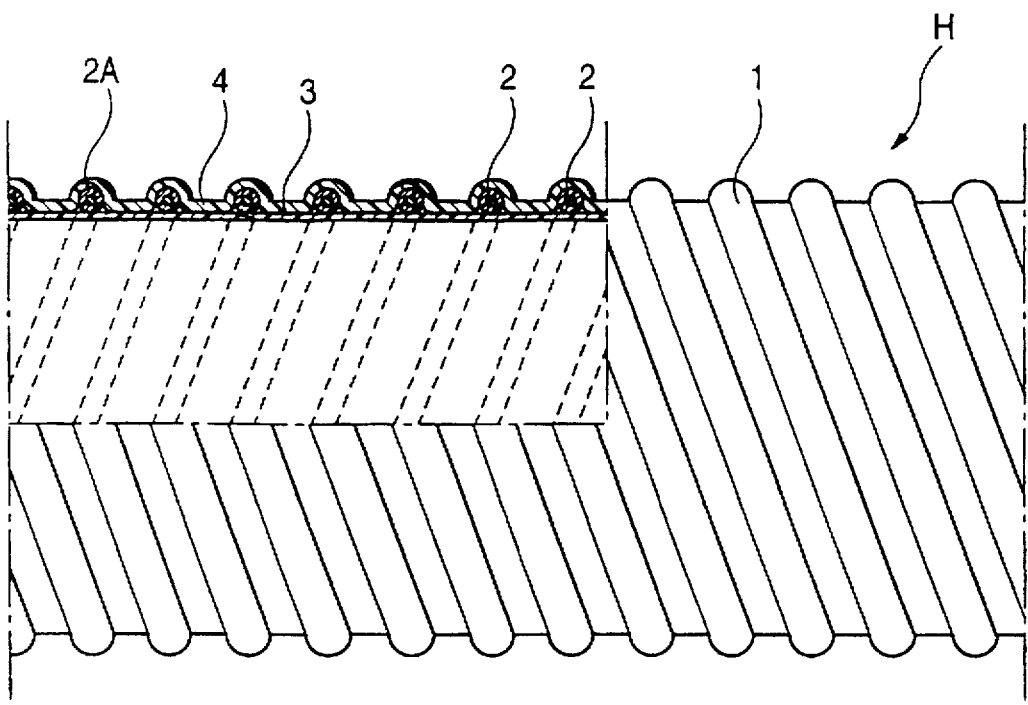
FIG. 7 is a partially cut-out front view of a pipe wall portion showing another embodiment.

In the weight comparison of only reinforcing wires, it can be confirmed that the weight in the hose according to the present invention is heavier only by about 2 g per 1 m of the hose than the weight in the conventional hose. That is, this means that the present invention can make the hose lighter by the weight substantially corresponding to the total weight of the current conducting wires 30 disposed in parallel with the reinforcing wires 20 in the conventional hose and the total weight of their coated portions, that is, in detail, by the weight expressed as follows:

the total weight of the conducting wires 30 + the total weight of their coated portion −2 g FIG. 7 shows another embodiment of a hose, having a structure in which a pipe wall 1 of a hose H is constituted by inner and outer layers of an inner layer 3 and an outer layer 4, and four coated and insulated reinforcing hard steel wires 2... (coated wires 2A–2D...) are disposed between these inner and outer layers 3 and 4. In this case, bared wires which are not coated and insulated may be used as the reinforcing wires 2 so as to make the total weight of the hose lighter. Though not shown, reinforcing threads may be put between the inner and outer layers 3 and 4 also in this embodiment. However, these reinforcing threads are not always required.

Figure 9:
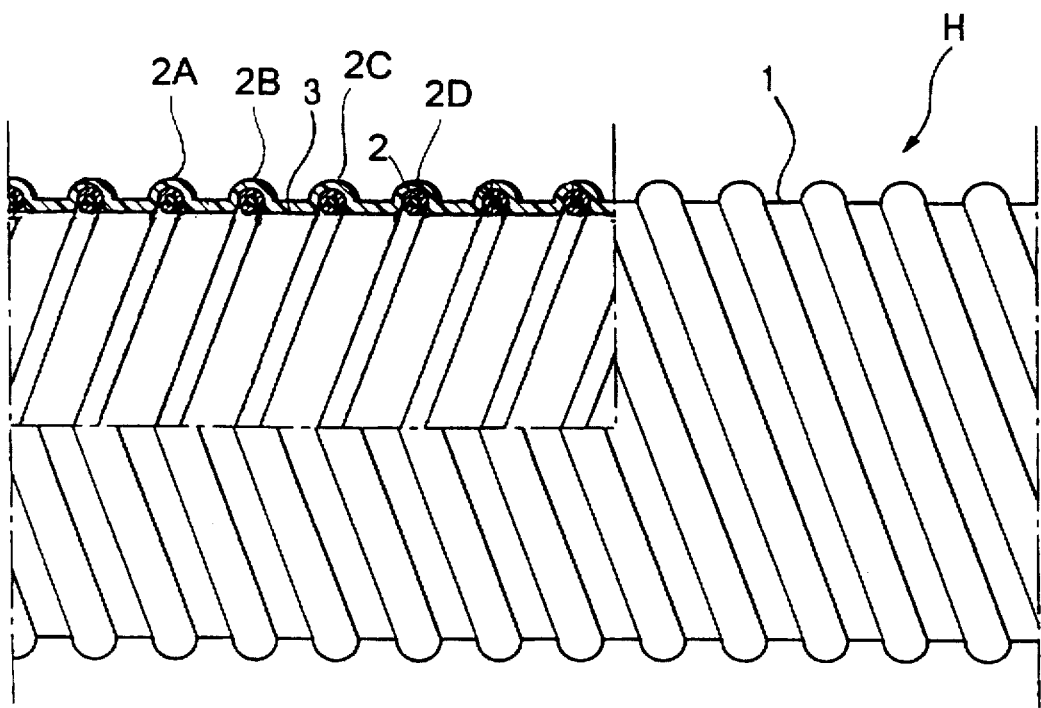
FIG. 9 illustrates a partially cut-out front view of yet another embodiment.
Figure 10:
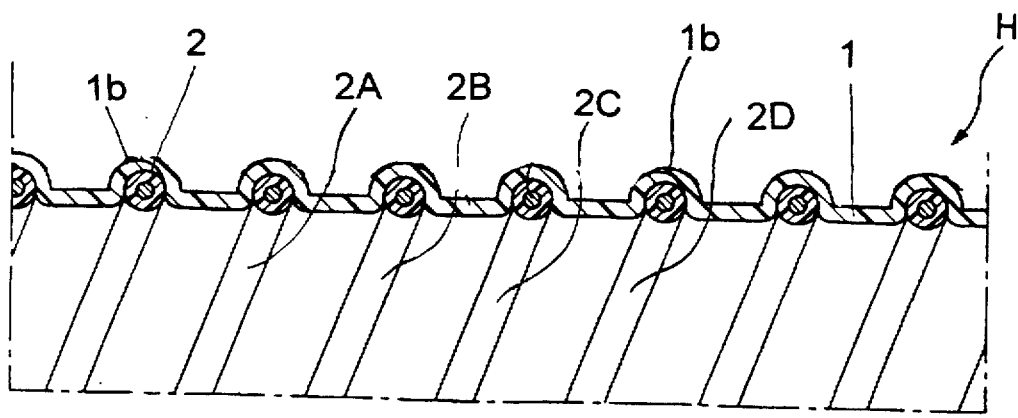
FIG. 10 illustrates an expanded sectional view of a pipe wall portion in the embodiment of FIG. 9.

FIG. 9 illustrates a partially cut-out front view of yet another embodiment, and specifically shows that the pipe wall is formed by a single layer. FIG. 10 illustrates an expanded sectional view of the pipe wall portion in the embodiment of FIG. 9, which includes the single layer. In FIGS. 9 and 10, portions similar to those in the other drawings described above are designated by the same reference numerals. Reference numeral 1b designates an overlapped connected portions of the spirally wound single layer 1.

According to the present invention, the bonding between the insulating coating layer 2a of each reinforcing wire 2 and the pipe wall 1 in the hose H and the bonding between the layers of the pipe wall 1 are not limited to bonding with a bonding agent, but may be performed by means such as heat fusing or the like. When the bared reinforcing wires 2 or the coated wires 2A–2D are disposed in a sandwiched state between the layers of the pipe wall 1, the wires 2 or 2A–2D may be disposed without being bonded with the pipe wall 1.

Although the embodiments which are considered to be representative of the present invention have been described above, the present invention is not always limited to the structures of these embodiments, but those embodiments may be modified within a scope which has the above-mentioned constituents stated in the present invention, which attains the object stated in the present invention, and which has the following effects.

As has been apparent from the above description, in the cleaner hose according to the present invention, the absolute length of respective reinforcing hard steel wires can be made about 49% shorter than that of the reinforcing wires of a conventional hose, so that the electric resistance can be also reduced into about a half. Therefore, the reinforcing hard steel wires can be used as power conducting wires, and conducting power to a motor provided in a suction nozzle head can be performed through the reinforcing wires. In addition, since the shape of the hose is kept surely by use of the four reinforcing wires, it is possible to expect a conspicuous effect that the hose is superior in keeping the shape, is not easily transformed by an external force, and particularly can be made much lighter than a conventional hose having current conducting wires for conducting power.

In addition, in comparison with a conventional hose having reinforcing wires and current conducting wires, it is possible to expect such effects that the hose can stand for a sufficiently long term use with extremely less fear of breaking because only the hard steel wires are used, and the manufacturing can be carried out simply and rapidly, because the four reinforcing wires are wound spirally in order in manufacturing the hose. Accordingly, the manufacturing cost can be reduced. Further, the hose can be used easily with less feeling of fatigue in use because the hose is light in weight.

What is claimed is:

1. A cleaner hose, comprising:

a pipe wall formed of a synthetic resin, said pipe wall comprising a spirally wound wall; and four reinforcing wires disposed spirally, at predetermined intervals, in said pipe wall, having electrical connections for electrically supplying power externally of said hose.

2. A cleaner hose according to claim 1, wherein said reinforcing wires comprise hardened steel wires coated with synthetic resin.

3. A cleaner hose comprising:

a pipe wall formed of a synthetic resin, said pipe wall comprising a spirally wound wall; and four reinforcing wires disposed spirally at predetermined intervals, in said pipe wall, wherein said pipe wall includes inner and outer layers comprising a lower tape and an upper tape, respectively, wherein said inner and outer layers are spirally wound and displaced by a half pitch from each other.

4. A cleaner hose comprising:

a synthetic resin pipe wall;

four reinforcing hardened steel wires disposed spirally at predetermined intervals, in said synthetic resin pipe wall, wherein said pipe wall includes inner and outer layers comprising a lower tape and an upper tape, respectively, wherein said inner and outer layers are spirally wound and displaced by a half pitch from each other; and reinforcing threads disposed between said inner and outer layers of said pipe wall.

5. A cleaner hose according to claim 3, wherein said inner and outer layers of said pipe wall include circumferential portions over said reinforcing wires, said inner layer being bonded to said outer layer only at said circumferential portions such that a plurality of spaces are formed between adjacent circumferential portions.

6. A cleaner hose according to claim 3, wherein said reinforcing wires are bonded to said inner layer of said pipe wall.

7. A cleaner hose according to claim 1, wherein said pipe wall includes an inner layer and an outer layer, and said reinforcing wires are disposed between said inner layer and said outer layer.

8. A cleaner hose comprising:

a pipe wall formed of a synthetic resin said pipe wall comprising a spirally wound wall and four reinforcing wires disposed spirally at predetermined intervals, in said pipe wall, wherein said reinforcing wires comprise a first set of conductive wires and a second set of conductive wires, wherein said first set of conductive wires are for controlling a first motor and said second set of conductive wires are for supplying power to a second motor.

9. A cleaner hose as in claim 8, wherein said first set of conductive wires comprises a first pair of conductive wires and said second set of conductive wires comprises a second pair of conductive wires.

10. A cleaner hose as in claim 1, wherein each of said reinforcing wires comprises a core of hardened steel having a corrosion-preventive plating coated with synthetic resin.

11. A cleaner hose as in claim 3, wherein said inner and outer layers have a corrugated shape such that said inner layer includes first recesses for receiving said reinforcing hard steel wires and said outer layer includes second recesses for receiving said inner layer.

12. A cleaner hose as in claim 11, wherein said inner layer includes ridges for being positioned in said second recesses and said inner layer is bonded to said outer layer only where said ridges contact said second recesses.

13. A cleaner hose as in claim 3, wherein said inner and outer layers each have a width greater that a distance between five adjacent reinforcing wire portions of said reinforcing wires crossing a longitudinal portion of said cleaner hose.

14. A cleaner hose according to claim 1, wherein said pipe wall includes a single layer.

* * * * *